INVENTOR.
ROBERT J. HIRVELA
BY
Moody and Phillips
ATTORNEYS

INVENTOR,
ROBERT J. HIRVELA
BY
Moody and Phillips
ATTORNEYS

INVENTOR
ROBERT J. HIRVELA
BY
Moody and Phillips
ATTORNEYS

INVENTOR.
ROBERT J. HIRVELA

BY
Moody and Phillips
ATTORNEYS

INVENTOR.
ROBERT J. HIRVELA
BY
Moody and Phillips
ATTORNEYS

INVENTOR.
ROBERT J. HIRVELA

BY
Moody and Phillion
ATTORNEYS

INVENTOR.
ROBERT J. HIRVELA
BY
Woodyard Phillips
ATTORNEYS

INVENTOR
ROBERT J. HIRVELA
BY
Moody and Phillips
ATTORNEYS

INVENTOR
ROBERT J. HIRVELA

BY
Moody and Phillips
ATTORNEYS

INVENTOR
ROBERT J. HIRVELA
BY
Moody and Phillips
ATTORNEYS

United States Patent Office

Re. 26,984
Reissued Nov. 24, 1970

26,984

STORAGE MEANS FOR RECEIVING, ASSEMBLING AND DISTRIBUTING TELETYPE CHARACTERS

Robert J. Hirvela, Cedar Rapids, Iowa, assignor to Collins Radio Company, Cedar Rapids, Iowa, a corporation of Iowa Original No. 3,350,697, dated Oct. 31, 1967, Ser. No. 434,964, Feb. 24, 1965. Application for reissue Oct. 7, 1968, Ser. No. 803,137

Int. Cl. G11c *9/00*

U.S. Cl. 340—172.5 23 Claims

Matter enclosed in heavy brackets [ ] appears in the original patent but forms no part of this reissue specification; matter printed in italics indicates the additions made by reissue.

ABSTRACT OF THE DISCLOSURE

[This structure functions to receive relatively slow serial type data, as from a TTY machine, transform such serial information into bit parallel characters and then supply the bit parallel characters to a data processor at high speed. The structure also functions in reverse to receive bit parallel characters from the data processor at high speed, transform them to serial data form, and then distribute the serial data at slow speeds to TTY machines. The structure utilizes circulating memories which can be selectively accessed.]

*This structure receives, in sequential order, the relatively slow serial type data from a bank of teletypewriters, transforms such serial information into bit parallel characters, and then supplies the bit parallel characters to a data processor at high speed. The slow speed serial data is supplied to, and assembled in, unique and identifiable time positions in a group of circulating memories under control of suitable time-keeping means. Periodically the stored characters are transmitted in parallel and at high speed to a data processor.*

This invention relates generally to means for storing and assembling information and, more particularly, it relates to a circulating memory means for receiving and storing information received serially from each of a plurality of sources, such as teletypewriters, with the serial information received from each individual teletypewriter source being stored in a parallel form, and subsequently transferred to a data processor, for example, for switching and processing purposes.

In current data processing systems, particularly those data processing systems used as switching systems, it is often necessary to receive characters from the battery of teletypewriters. For example, in the airline industry, a central data processing or switching system is employed to receive and process information from teletypewriters positioned at various airline terminals throughout the country.

Up to the present time, the transferring of the information from the teletypewriter to the data processor has been effected primarily by periodically scanning the lines leading into the data processor from each teletypewriter. Such a method involves the scanning of each baud period of each teletypewriter at least three times in order to make certain that all bauds from all teletypewriters are received by the data processor and are received accurately. With a large battery of teletypewriters the percentage of operating time that a data processor must use in just scanning the teletypewriters can amount to a very substantial portion of the total computer operating time. For example, assume that a particular data processor has a maximum capacity of 512 teletypewriters. Assume, further, that it is necessary to scan each baud three times in order to insure accuracy. Assume, still further, that it requires microseconds to store the results of a single scan of a single baud in the main memory of the data processor. Consequently, to scan each baud of the 512 teletypewriter outputs three times, requires a total of approximately 76 milliseconds ($512 \times 3 \times 5 = 7.5$ milliseconds). Since a baud length on the average is about 13 milliseconds, the foregoing means that approximately 60% of the computer time is employed in scanning the 512 teletypewriters. The 60% figure does not include the amount of computer time required to compare the various scans in order to insure that the criteria of accuracy has been met with respect to individual bauds.

A primary object of the present invention is to provide a means for supplying teletypewriter characters from a battery of teletypewriters to a data processor, sometimes herein referred to as a switching center, in from 2 to 3 percent of the time required by the prior art method discussed above.

A further object of the invention is to provide a much faster means of supplying TTY characters to a data processor and with substantially greater reliability than has been available heretofore.

A third aim of the invention is to provide a means for supplying teletypewriter characters from a battery of teletypewriters to a switching center in parallel form rather than in the series form used in prior methods.

A fourth purpose of the invention is to provide a means for storing the characters from each of a battery of teletypewriters and then supplying each of said stored characters to a data processing switching center in parallel form, and in rapid succession, so that only 1 or 2 percent of the computer time is necessary for a peak load of teletypewriter characters.

A further object of the invention is to provide a means for sampling, detecting, and storing the serially transmitted characters from each of a plurality of teletypewriters in parallel form and then supplying said parallel stored characters to a data processor in the parallel form and in rapid succession with a high order of accuracy and reliability.

In accordance with the invention, a plurality of circulating memories are provided. Five of such circulating memories are provided to hold the five bauds of each teletype character, and eight additional circulating memories are provided to implement the time-keeping function which is necessary for sampling the bauds stored therein at the proper time for transmission to the data processor.

The five data storing circulating memories are designed to receive a baud from a teletypewriter and to repetitively circulate the baud completely around such circulating memory in a certain predetermined time interval, which in the present embodiment of the invention, is 1024 microseconds. Thus, in each of the five data holding circulating memories, a baud from each of the 512 different teletypewriters can be stored and circulated two microseconds apart.

The eight time-keeping circulating memories store a plurality of counts, one such count being provided for each of the 512 baud positions in the circulating memory. The count for each baud position is initiated at the time the start pulse of a given teletypewriter is detected, and a "1" is added to the count each time the particular baud position makes a complete circulation around the circulating memories.

There is further provided a second counting means which is capable of counting to 1024 and is driven by a one megacycle clock. Such counting means functions both as an address for each baud position of the data holding circulating memories, and also has a means for selecting a particular teletypewriter corresponding to a particular count or address. More specifically, the counting means can be a binary counter having a capacity of $2^{10}$ which functions to connect the outputs of the teletypewriters one-by-one in succession to the circulating memories every other count, i.e., every two microseconds. The particular count of the binary counter, when the selection of any given teletypewriter occurs, will be the address of that given teletypewriter and will also be the address of the baud stored in the five data holding circulating memories from that given teletypewriter.

Since the data holding circulating memories and the binary counter have exactly the same cycling time, the baud stored in the circulating memory will travel exactly one complete circulation therein when the binary counter has counted completely around to the address of the said given teletypewriter.

Further, since the time interval of bauds from a given teletypewriter is, on the average, a little more than 13 milliseconds, and since the cycling time at the binary counter is 1.024 milliseconds, 13 or more cyclings of the binary counter is required before the next baud of a given teletypewriter can be sampled and stored in the second data circulating memory.

Once the start pulse of a character from any given teletypewriter has been detected, the count in the eight time-keeping circulating memories is initiated and from that point in time, the number of cyclings of the circulating memory is recorded. It is to be noted specifically that the number of cyclings of the data circulating memories for each baud position is recorded separately in the time-keeping circulating memories. After the start pulse has initiated the time-keeping counting, eighteen cyclings are permitted before the sampling of the first baud is done. More specifically, at the eighteenth cycling a gating means responds thereto to initiate a sampling of the second baud of said given teletypewriter. The gating means is activated by the count of eighteen in the time-keeping mechanism at precisely the same instant in time that the binary counter will have selected said given teletypewriter and supplied its output to the input of the first data holding circulating memory.

In a similar manner, the second, third, fourth, and fifth bauds of said given teletypewriter are sampled at the proper times in accordance with the time-keeping circulating memories and the samplings entered into the second, third, fourth, and fifth data holding circulating memories of the system.

At the same time the said given teletypewriter is entering its character into a particular word address in the circulating memories, the characters from other teletypewriters are also being stored in the five data circulating memories, but at different times (baud positions) in the 1024 microsecond cycling period of the circulating memory. The storing of characters from the different teletypewriters is completely independent of each other, except that all the storing is done on one of the counts of the binary counter. More specifically, as will be seen later, all storing is done either on even counts or on odd counts. If the storing is done on odd counts, a buffer storage operation, to be discussed later, is performed on the even counts.

After the five information bauds are stored from a given teletypewriter, the stop pulse of the character is sampled and stored, and initiates a logic signal whereby the now complete teletypewriter character is set back one microsecond on the data circulating memories into what is herein referred to as the buffer storage.

When a read command from the data processor occurs, the completed words stored in the buffer storage are read out of said buffer storage and into the data processor, at a rate of one character every two microseconds.

In accordance with a feature of the invention, the teletypewriter characters are assembled on the odd count of the binary counter and then shifted into the buffer storage positions on the even counts of the binary counter.

It is to be noted that a word is completely assembled in the circulating memories before it is shifted to its buffer storage position. Upon shifting of the character to the buffer storage position the assembly character position can be completely cleared of its stored character and the assembly of a new character, from the same given teletypewriter, initiated.

In accordance with another feature of the invention, the sampling and the assembly, in parallel form, of an entire group of teletypewriter characters, from different teletypewriters, is accomplished before any communication with the data processor is made. Then, upon a proper read command from the data processor the assembled teletypewriter characters are read directly into the data processor in parallel and at the rate of one character every two microseconds.

In accordance with a third feature of the invention, two teletypewriter characters in adjacent buffer storage positions in the five data holding circulating memories can be further assembled into a single 10-baud character and the 10-baud character transferred directly to the data processor. With this latter arrangement the transfer rate to the data processor is one character every four microseconds.

The above-mentioned and other objects and features of the invention will be more fully understood when read from the following detailed description thereof when read in conjunction with the drawings in which.

As discussed in the introduction of this specification, the general principle of this invention involves the use of a plurality of circulating memory delay lines; five of which are used to hold the data from remote teletype transmitters and eight of which are employed as a time-keeping means to indicate when a teletype character is initiated, or is first received, and when sampling of the subsequent bauds thereof should be made, and further determines when the complete teletype character has been received and stored in the five baud storing circulating memories. A binary counter is also supplied which selectively and successively connects the outputs of the various teletypewriters to the inputs of the five baud storing circulating memories and in so doing provides an address for the stored bauds, which address corresponds to the particular count at which a particular teletypewriter is selected for transfer of data to the circulating memories.

In describing the invention and the operation thereof, the following general format will be employed:

(a) The circulating memory delay lines will first be discussed generally in conjunction with FIG. 1 and the curves of FIG. 5 to provide a background of circulating memories as employed in the invention.

(b) A general discussion of the invention including the line counter and the time-keeping system will be set forth. The line counter, otherwise known as the binary counter, establishes the addresses by which a particular baud stored in the circulating memories is identified and by which the corresponding teletypewriter is selected. The time-keeping system for the delay lines functions to aid in sampling the incoming bauds of the teletypewriters at the proper times.

(c) The circuit for verifying the start of a TTY word will next be discussed.

(d) The delay line character assembly will then be described with particular emphasis on the use of the line counter to correlate proper assembly position of the five baud storing circulating memories with the particular teletypewriter which at the moment is being polled.

(e) The buffer storage function of the invention will next be discussed in some detail with emphasis on the transferring of a completed teletype character from an assembly character position in the circulating memories to a buffer storage position of the circulating memories.

(f) Finally, the circuit means for transferring data from the assembler to a data processor will be described.

Figure 9:
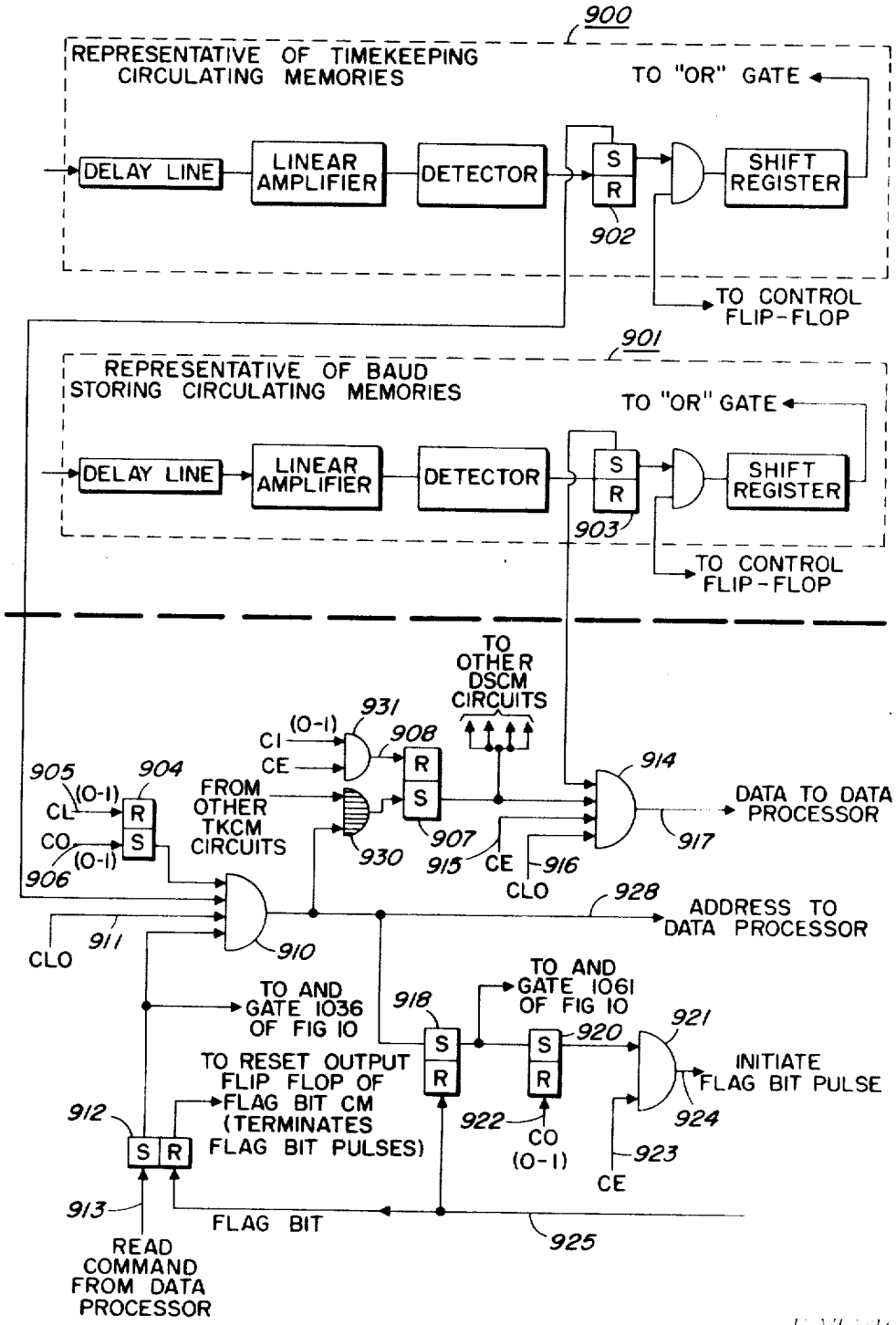
FIG. 9 shows a logic diagram for reading characters from the buffer storage positions to the data processor.
Figure 10:
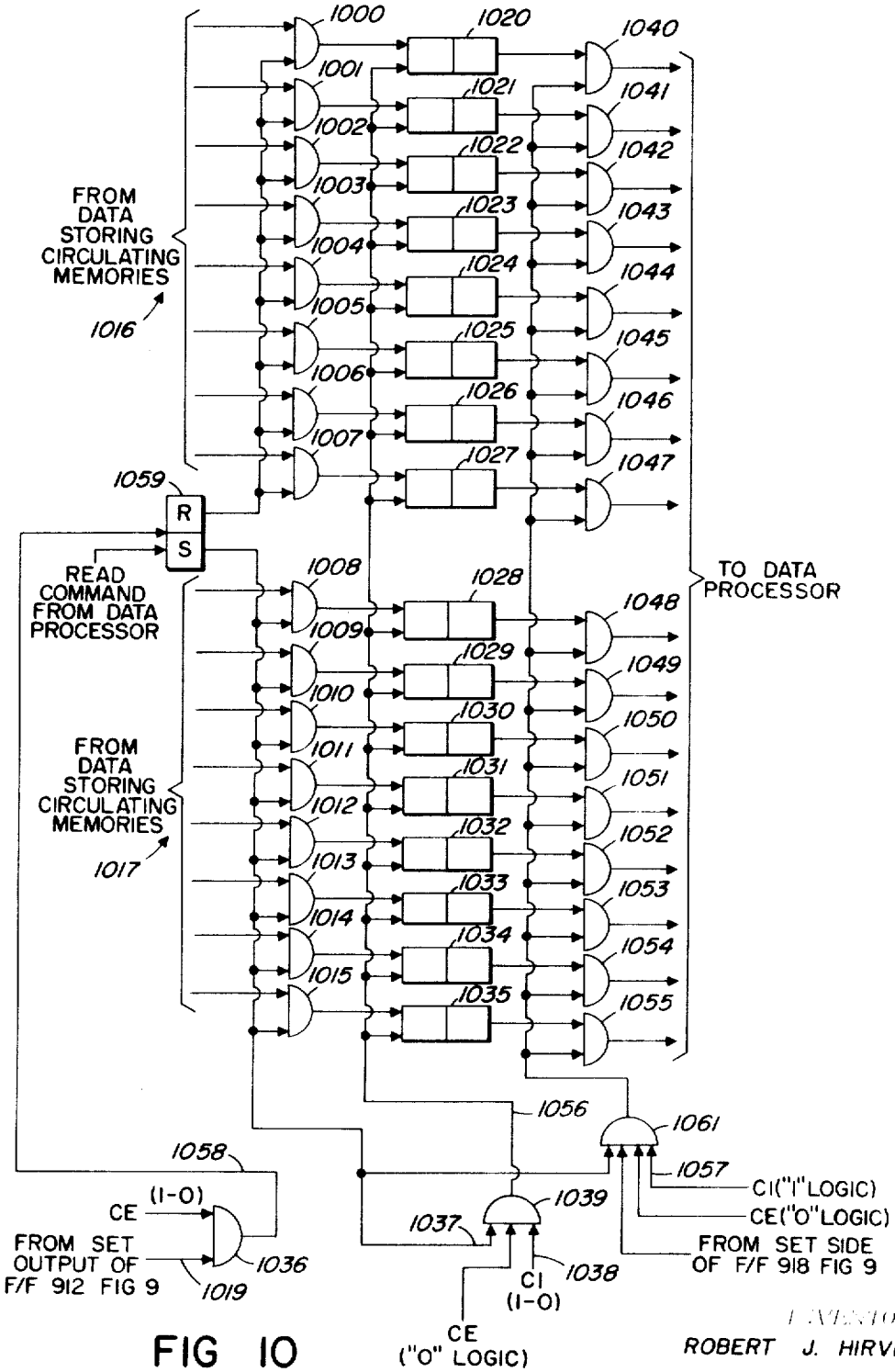
FIG. 10 is a logic diagram showing how information or teletype characters stored in the buffer storage positions are read therefrom and into a second buffer storage so that two characters are assembled in parallel before transfer to a data processor.

In accordance with the foregoing approach, the specification is divided into the following sections:

I.—Circulating Memory Delay Line (FIGS. 1 and 5)
II.—General Discussion of Invention (FIGS. 2, 7, and 8)
III.—Circuit for Verifying Start of TTY Word (FIG. 3)
IV.—Circulation and Addressing of Words (FIGS. 5 and 1)
V.—Circuit for Shifting Into Buffer Storage (FIGS. 4 and 6)
VI.—Reading Words Into Data Processor (FIGS. 9 and 5)
VII.—Combining Two TTY Words Before Transmission To Data Processor (FIG. 10)

I.—CIRCULATING MEMORY DELAY LINE (FIG. 1)

Figure 1:
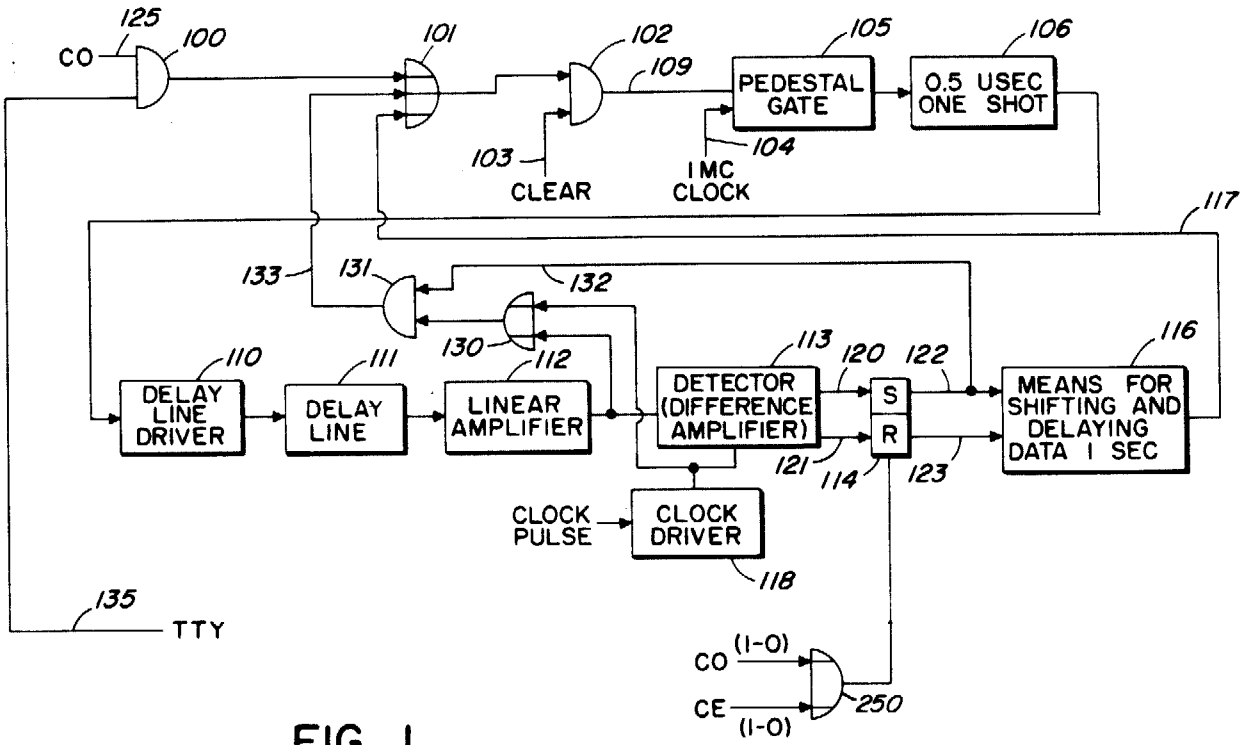
FIG. 1 is a block diagram of a circulating memory delay line.

Referring now to FIG. 1, there is shown a block diagram of a single circulating memory delay line. Data is entered into an input TTY of AND gate 100. The other input 125 of AND gate 100 has a pulse CE supplied thereto which forms the output pulse supplied to OR gate 101, as will be discussed in more detail later. The data input pulses pass through common OR gate 101 into an inverter circuit (NAND gate 102). From the output of NAND gate 102, the input pulses are supplied to pedestal gate 105, which also has a one-magacycle clock pulse input supplied to a second input 104 thereof. Coincidence of an input on lead 109 and a "1" to "0" transition of a clock pulse on input 104 will create an output from pedestal gate 105. A pedestal gate is defined herein as a gate which will produce a relative sharp pulse output in response to a voltage transition, as from a low level to a high level voltage on one of its input leads, and a predetermined voltage level on its other input lead. (See FIGS. 5a and 5g—to be discussed later.) Such output signal will trigger one-shot multivibrator 106, the output of which is supplied to line driver 110. From the output of line driver 110 a signal is supplied to delay line 111 which, in the preferred embodiment of the invention described herein, has a delay of 1023 microseconds. It is to be noted that a pulse represents a logic "1" and that the absence of a pulse represents a logic "0."

Due to the attenuation of the delayed line, which can be of the order of 50 decibels, the output thereof is supplied to linear amplifier 112. From the amplifier 112 the delay line output is supplied to detector 113 which, in essence, is a difference amplifier. Depending on the presence or absence of a pulse from linear amplifier 112 and upon the occurrence of a clock pulse from clock driver 118, an output pulse will appear on either output lead 120 or output lead 121 of difference amplifier 113.

An output flip-flop circuit 114 is responsive to the voltage levels of output leads 120 and 121 of difference amplifier 113 to assume one of its two stable states. More specifically, in the presence of a pulse from the linear amplifier 112 and a high level pulse (a zero in the waveform of FIG. 5a) from the clock driver 118, the output flip-flop 114 will be caused to be set by the output from difference amplifier 113. Thus, the output lead 122 of flip-flop 114 will function to impress an enabling signal on input lead 109 of pedestal gate 105, through inhibit AND gate 131, OR gate 101, and NAND circuit 102. When the next following "1" to "0" transition of the one megacycle clock pulse occurs, the output of pedestal gate 105 will trigger one-shot multivibrator 106 to supply a pulse to line driver 110 to carry on the recirculation of the bit. As will be discussed in detail later, the inhibit AND gate 131 and AND gate 130 function to prevent false firing of the pedestal gate 105 when the flip-flop 114 is set.

It should be noted that the time involved in passing the pulse through the output flip-flop circuit 114 is one microsecond. Such one microsecond, when added to the 1023 microseconds required for a pulse to pass through the delay line 111, results in a total delay in the circulating memory of 1024 microseconds ($2^{10}$ microseconds).

There are two principal purposes for employing output flip-flop circuit 114. One of these purposes is to provide a place in the circulating memory where the information is stored for a definite period of time, more specifically, approximately one microsecond, and from which storage place output signals can be taken. The second primary purpose for output flip-flop circuit 114 is to re-establish proper timing of the circulating pulses once each time a pulse completes a circulation through the delay line memory. The resynchronization or retiming of the circulating pulses also involves circuitry other than the flip-flop 114. More specifically, such resynchronization also involves pedestal gate 105, and the one-shot multivibrator 106, as will be discussed later in connection with the waveforms of FIG. 5.

Since some circuit means, such as flip-flop 114, is employed to provide a storage place from which the circulating data can be taken, and independent timing means is needed to restart the circulating pulse stored in the flip-flop 114. Such independent timing pulse is supplied by the "1" to "0" transition of the one megacycle clock, the output of which is supplied to input lead 104 of the pedestal gate circuit 105.

Some means are required to reset flip-flop 114 each clock pulse period in which a pulse is not received from the circulating delay line 111 in order to indicate the absence of such a pulse. Such resetting means is accomplished by the output of OR gate 250 which [has] as its input 1 to 0 transitions of the CO and CE pulses, as shown in FIGS. 5b and 5c. When a pulse is received from delay line 111, as pulse 500 of the waveform of FIG. 5e, for example, flip-flop 114 of FIG. 1 will be set as shown in FIG. 5f at time $t_1$ [$t_a$], since flip-flop 114 is designed to be controlled by a pulse such as pulse 500 when present. In the absence of a pulse such as pulse 500 from delay line 111, as accurs at time $t_2$ for example in FIG. 5e, the flip-flop 114 will be reset as shown in FIG. 5f shortly after time $t_2$ by the 1 to 0 transition of the CO pulse in FIG.

5c at time $t_2$. In a similar manner the output of OR gate 450 of FIG. 4 functions to reset flip-flop 114.

As was indicated briefly hereinbefore, input pulses from teletypewriters are supplied to the circulating memory delay lines every other microsecond. For discussion purposes, assume that the entry of the samplings of the teletypewriter bauds into the circulating memories occurs on the odd counts of the line counter. The input lead 125 of the AND gate 100 is connected to the odd count output of the one bit counter of the line counter and so will cause the AND gate 100 to become conductive (open) during each odd count of the line counter. Thus, once a pulse is entered into the circulating memory of an odd count from a teletypewriter, the AND gate 100 will always thereafter be opened at the proper time to recirculate such pulse therethrough.

However, it is not only necessary to recirculate bits stored in the assembly storage positions (the odd positions) but it is also necessary to recirculate bits that have been shifted into the buffer storage positions. The bits circulating in the buffer storage positions were first shifted into a buffer storage position by means of the shift register 116, which functions to delay a bit for one microsecond, and then to supply it to the circulating system via lead 117 and OR gate 101. Once in the circulating system, the bits in the buffer storage positions will be circulated in much the same manner as those bits in the assembly storage positions, although with minor differences which will be discussed later. Generally, it can be said at this time that the pulses circulating in the assembly address positions are regenerated exclusively on the odd counts of the line counter. The regeneration of the pulses or bauds recirculating in the buffer storage positions are regenerated exclusively on the even counts of the line counter.

The function of the NAND gate 102, basically, is that of an inverter, but it further functions as a gate. If desired, pulses which would otherwise be supplied to the pedestal gate can be cleared from the circulating memory by applying a clear pulse at the appropriate time to the input lead 103 and the NAND gate 102. More will be said of the purpose of such clearing function later herein.

II.—GENERAL DISCUSSION OF INVENTION (FIGS. 2, 7 AND 8)

Figure 2:
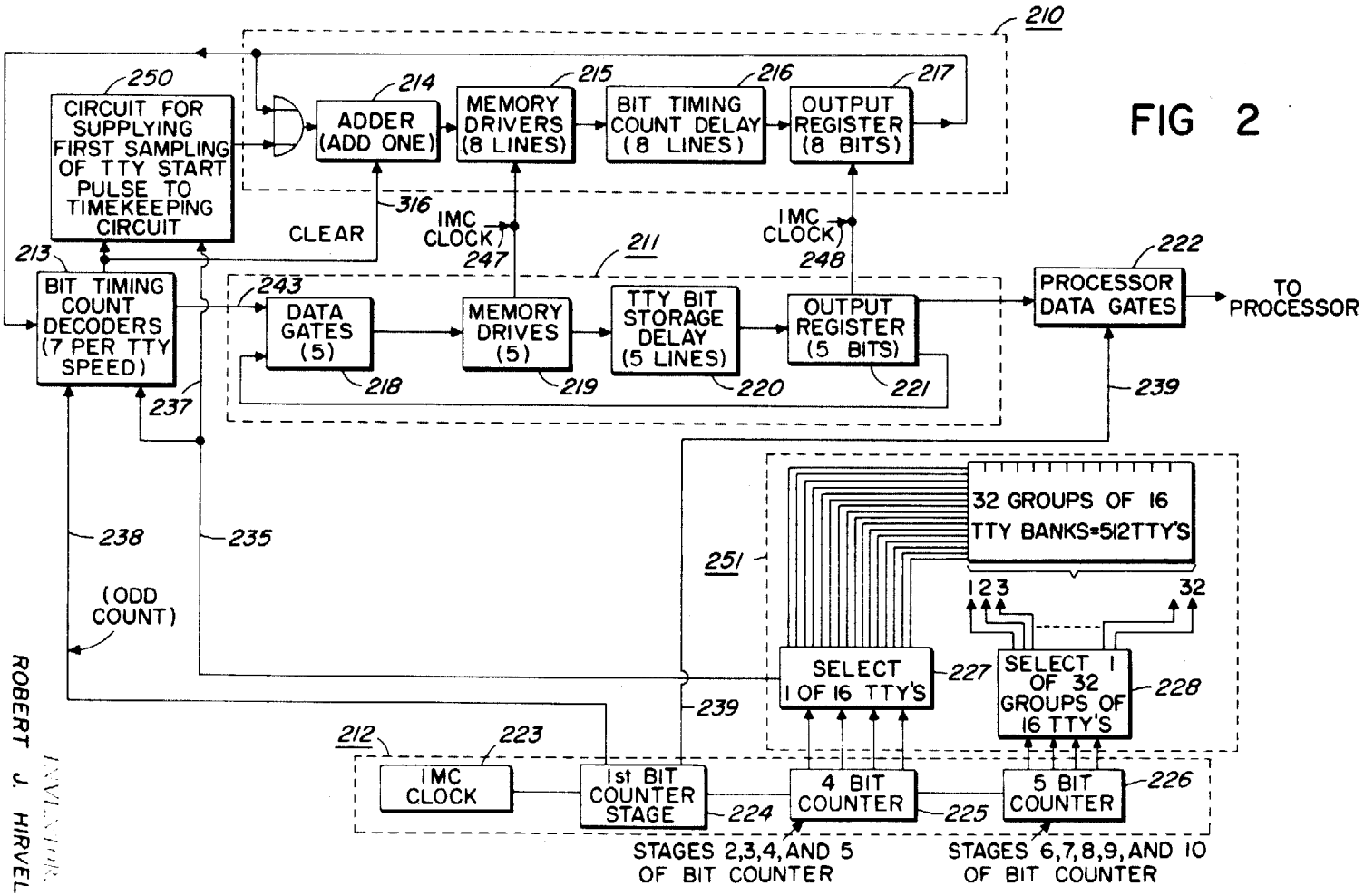
FIG. 2 shows a general block diagram of the invention.

Referring now to FIG. 2, there is shown a block diagram of the invention but without the structure or logic required to shift an assembled character from the assembly address positions to the buffer storage positions and, further, without the logic required to reset the counts of the time-keeping delay circuits back to zero when a complete teletypewriter character has been accumulated in the baud storing circulating memories.

FIG. 2 may be regarded as comprising four main parts. The first of these parts is enclosed within the dotted line 251 and includes the teletype output data lines and also the decoding means for selecting one of the plurality of teletype lines. In the particular embodiment of the invention being described herein, assume that there are 512 teletype lines, thus requiring a decoding means capable of selecting one 512 different lines. Such decoding means include the blocks 227 and 228.

The second main portion of the circuit of FIG. 2 consists of the line counter shown within the dotted block 212. This line counter consists of a 10-stage binary counter responsive to the output of a one megacycle clock 223. As can be seen from FIG. 2, the second, third, fourth, and fifth stages (block 225) of the binary counter are connected to the decoder 227 and function to select one of sixteen teletype lines. Stages 6, 7, 8, 9, and 10 (block 226) of the binary counter function to control the decoder 228 and are capable of selecting one of thirty-two groups of teletype lines, each group containing sixteen lines.

The first stage 224 of the 10-bit line counter performs three functions. One of these functions is to provide the timing for the assembly of the characters in the five baud storing circulating memories. Such function is enabled, generally, by connecting the odd count output line 238 to the bit timing count decoder 213.

A second function of the one-bit counter is to gate the words stored in the buffer storage addresses out to the data processor.

A function of the even count of the one-bit counter is to assist in the shifting of the assembled characters in the five baud storing circulating memories from the assembly storage positions into the buffer storage addresses.

The third main portion of the circuit of FIG. 2 is the time-keeping portion which is included within the dotted block 210 and consists essentially of eight circulating memories similar to the one discussed in connection with FIG. 1.

The fourth major portion of the circuit of FIG. 2 is included within dotted black 211 and consists of five circulating memories which are employed to store the five bauds of a given teletypewriter character.

Since the line counter 212 has a total count of 1024 and is driven by the one megacycle clock 212, it is apparent that said line counter will count to 1024 once each 1024 microseconds, which is exactly equal to the time required for a pulse to recirculate once around each of the circulating memories. Therefore, if a pulse is inserted into the circulating memory on a given count of the line counter it will thereafter always appear at the output of flip-flop 114 of the circulating memory 1024 microseconds later, at which time the count of the line counter will have repeated itself. In other words, any given address position of the circulating memory is defined precisely by a particular count of the line counter and at this count of the line counter such pulse will appear at the output flip-flop of the circulating memory.

Furthermore, since there are only 512 teletypewriters, the line counter can be caused, and is caused, to select a specific teletypewriter every other count of the line counter. In the particular structure of FIG. 2 a teletypewriter is selected on each odd count of the line counter. Thus, any given teletypewriter output line will always be selected on a unique odd count of the line counter.

Thus, the 512 output lines of the 512 teletypewriters can be scanned in 1024 microseconds, and the bauds on all 512 teletypewriter lines stored in separate assembly address positions of the circulating memories. As discussed above, the positions in between the assembly address positions are used for buffer storage purposes.

It is to be understood that all the circuit means shown in FIG. 2 are outside or external to a data processor. It is only after a complete character of a number of a teletype machines (up to 512 machines) are stored in the associated buffer storage addresses that read-out of the information to the processor is done.

In the actual assembly of data in the data storing circulating memories of block 211, the teletype output lines are selected individually and in succession, one every two microseconds. Assume, for example, that the teletypewriter #16 is represented by count 31 of the line counter and is being scanned by decoders 227 and 228, and further has just commenced transmitting a start pulse. The decoders 227 and 228 will connect the output terminal of teletypewriters #16 to the bit timing count decoder 213.

Figure 3:
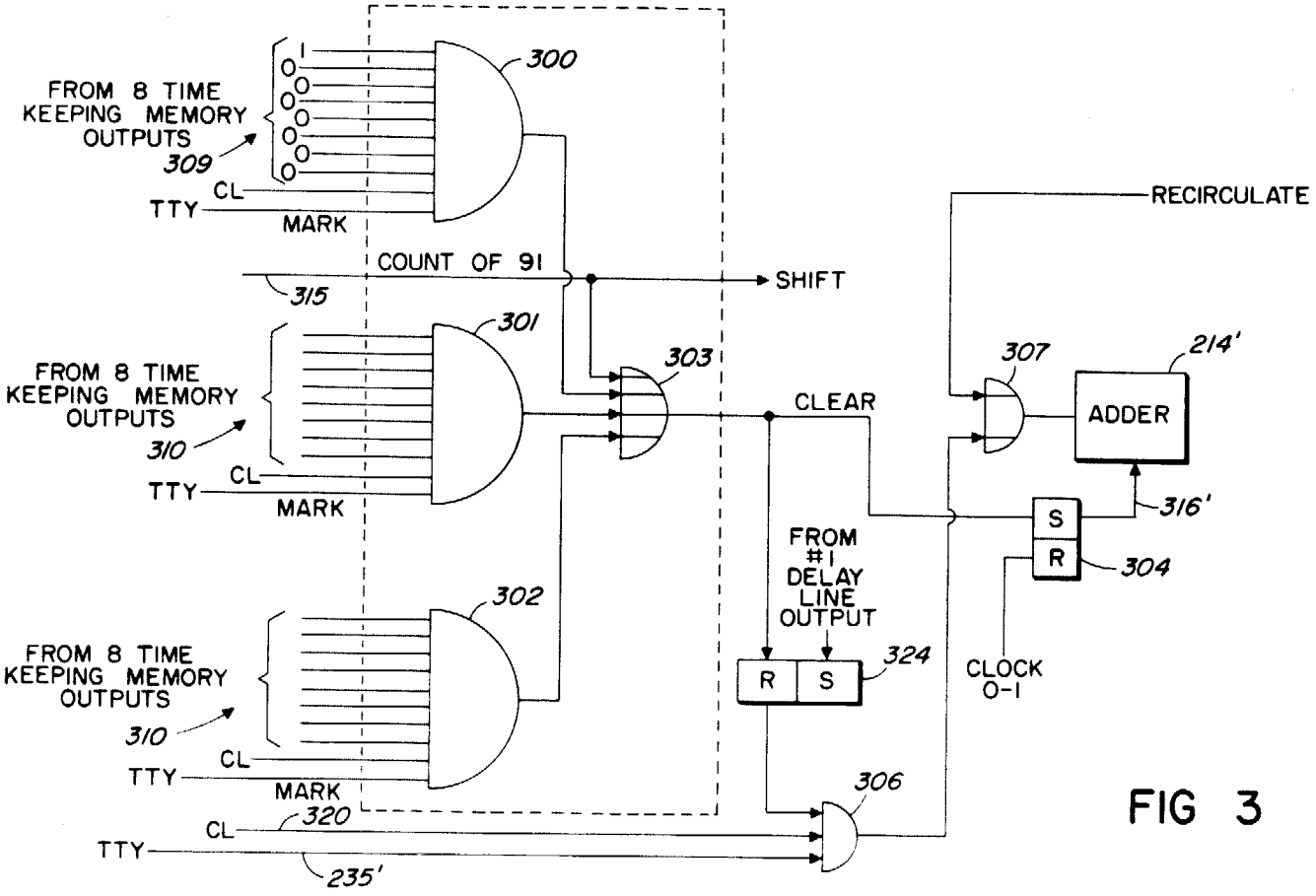
FIG. 3 is a logic diagram showing how the time-keeping count for any address position in the circulating memory is initiated.

By a special TTY start pulse sampling circuit means 250 designed to avoid false startings, three successive samplings of the start pulse of teletypewriter [31] *16* must occur before the time-keeping circuit 210 is energized. Such special circuit 250 to insure the accurate detection of the start pulse is shown in FIG. 3 and will be discussed later. For the time being assume that three successive samplings of the start pulse of teletypewriter do indicate the presence of a start pulse.

The first sampling of the start pulse of the #16 teletypewriter passes through the lead 235, and TTY start pulse sampling circuit means 250, and then into adder 214 of the time-keeping circuit. It should be noted that initially all address positions of the time-keeping circuit contain zeros. The first sampling of a start pulse introduces a logic "1" into the first circulating memory of the eight time-keeping circulating memories circuit at address position 31. This logic "1," which is represented by a pulse, immediately commences to circulate through the first memory circuit and 1024 microseconds later, re-enters the adder circuit. The adder circuit responds thereto to add a "1" thereon, thus resulting in a binary two being stored in address 31 of the time-keeping circuit. The binary two is, of course, represented by a pulse in the second circulating memory of the time-keeping circuit. Such pulse circulates and when it reaches the adder circuit 1024 microseconds later, the said adder circuit responds thereto to add a "1" to the number accumulated therein, thus making a total of 3 stored in the time-keeping circuit.

During these two cyclings of the time-keeping circuit the #16 teletype output line has been sampled again twice. If these samplings each indicate the presence of a start pulse from teletype #16, it is assumed that the start pulse is valid.

Figure 7:
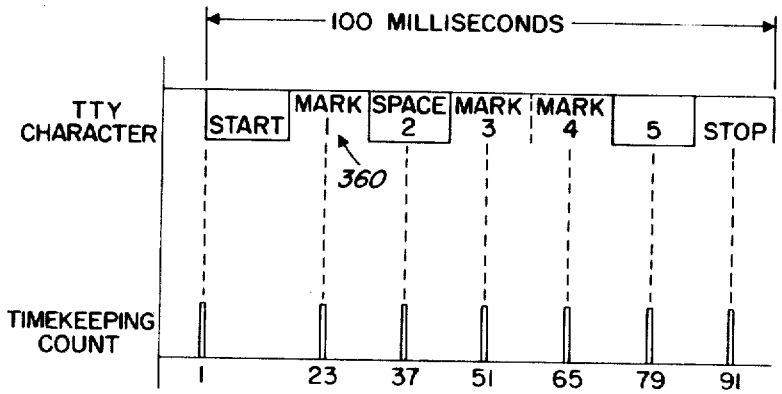
FIG. 7 is a set of two waveforms showing the counts of the time-keeping function at which samplings of the teletype bauds can be made.

Since teletype characters have a rather long time duration compared to the circulating time of the circulating memories, several circulations of the delay lines are required before the first baud from a teletype machine is sampled. In FIG. 7 there is shown a teletype character along with certain counts of the time-keeping memory, at which counts occur the samplings of the five bauds and the stop baud of a teletypewriter character of approximately 106 milliseconds in length. It can be seen from FIG. 7 that sampling of the first baud should occur at about the 23rd count, or circulation of the time-keeping circuit; the second baud should be sampled at the 37th of the time-keeping circuit, and so on. The first count was initiated by the first sampling of the start pulse, as discussed above.

It is to be noted that although only one sampling for each baud is shown in FIG. 7, in actual practice two or more samplings of each baud are made to insure accuracy. The samplings are then processed within the computer or by some suitable comparing circuit which selects two out of three samplings, for example. For purposes of clarity, however, assume that only one sampling per baud is made.

Figure 3A:
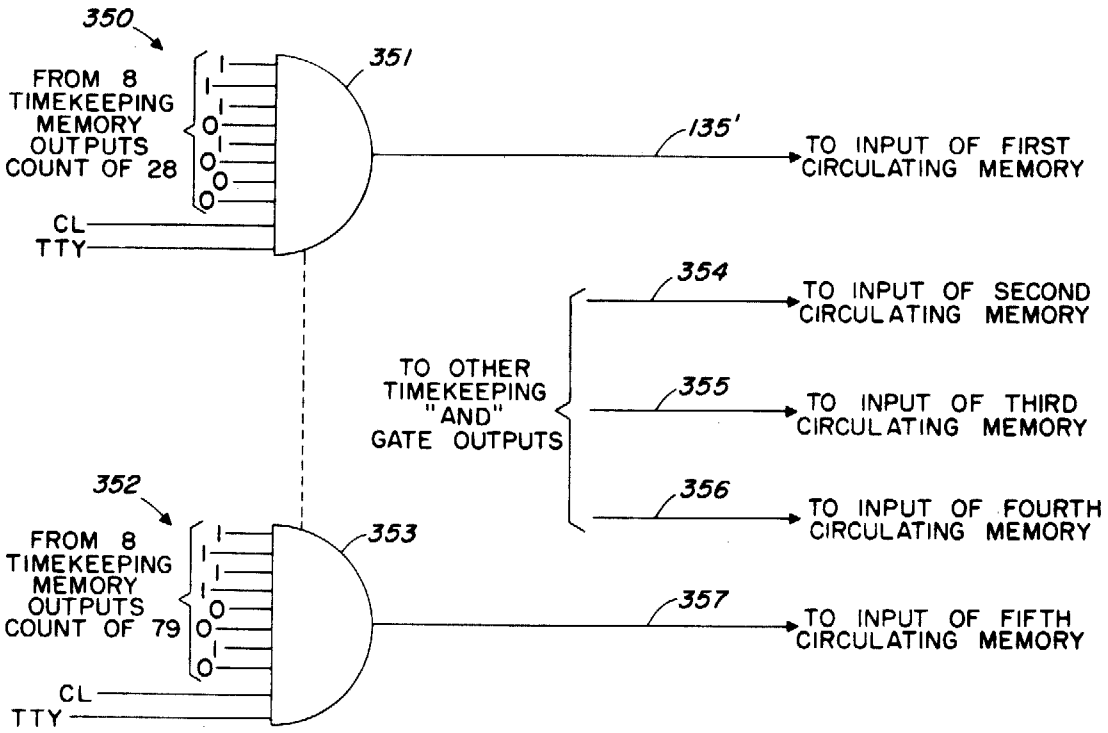
FIG. 3a is a logic diagram for sampling teletype signals at the proper times.

Thus, at the 23rd count, 37th count, 51st count, 65th count, 79th count, and 91st count of the time-keeping circuits, the signal appearing on the teletypewriter data line 235 is sampled by the bit timing count decoder circuit 213 of FIG. 2 to determine whether a mark or a space is present on the line. It is to be noted that such sampling always must occur at the 31st address position of the circulating memories. For example, at the 23rd count a mark is being transmitted from the teletype machine. At a point in time 31 microseconds after the count 23 occurs, the #16 teletype output is sampled and the result thereof fed through lead 243 into data gates 218 of the data storage circulating memories 211. More specifically, the feeding of this sampling into the data storage memories is effected by gating means within count decoder 213 in response to the count of 23 appearing on the output lead 232 of the time-keeping circuit. At such time, gating means not shown in FIG. 2, but see FIG. 3a, are opened (made conductive) to permit the sampling of the output lead of [teletypewriter 231] *decoder 213* to be supplied to data gate 218. In the case of a mark at count 23 there will be no pulse introduced into the data storage circulating memories 211 since a mark is represented by no pulse. However, at the count 37 of the time-keeping circuit a space will be sampled on the output terminal of teletypewriter #16, as shown in FIG. 7, and such space is represented by a pulse being supplied to data gates 218 from count decoder 213.

The first baud, sampled at count 23, is supplied to the first of the five circulating memories of the data storing delay lines. The second baud, sampled at time 37 and comprising a space, is supplied by proper gating means to the second circulating memory of the five data storage delay lines. In a similar manner the third, fourth, and fifth bauds of FIG. 7 are supplied to the third, fourth, and fifth circulating memories of the block 211 in FIG. 2.

At the count of 91, the five data bauds of the teletype character will have been stored in the circulating memories and the stop pulse sampled. Suitable gating means shown in FIG. 3 respond to the count of 91 to reset the time-keeping circuit to zero. Further, since the stop pulse is a mark, the count will remain at zero until the start pulse of a subsequent character occurs. Thus, it can be seen that the timing count will synchronize automatically with the TTY start pulse of each character.

The type circuitry required to sample the teletype bauds at the proper times, as discussed above, is shown in FIG. 3a. Generally speaking, such structure is comprised of a plurality of AND gates; an AND gate for each sampling occurrence. In FIG. 3a, only two of such AND gates (351 and 353) are shown and other AND gates are indicated generally by their output leads 354, 355, and 356.

As a specific illustration of the operation of AND gates, consider AND gates 351 which responds to a count of 23 to sample the first baud 360 of FIG. 7. There are 10 input leads to AND gate 351, eight of which come from the outputs of the eight time-keeping circulating memory outputs, the ninth of which receives a clock pulse, and the 10th of which is connected to the output of the teletype machine being polled.

AND gate 351 is constructed so that upon the coincidence of a binary count of 23 supplied to the eight input leads from the time-keeping circuit, a clock pulse, and a "space" sampling from the teletype machine, an output pulse will appear on output terminal 135' of AND gate 351. Such output pulse is supplied to the lead 135 of FIG. 1 and then through AND gate 100, OR gate 101, and into the first of the five data-containing circulating memories.

It should be noted that a pulse is supplied to the circulating memory only in the presence of a space. If a mark is being received from the TTY, the gate 351 will remain closed and no output pulse will appear on output lead 135'.

In a similar manner bauds 2, 3, 4, and 5 are sampled. AND gate 353 (FIG. [7] 3*a*) functions to sample baud 5 (*FIG. 7*) to supply an input pulse (in the case of a space) to the input of the 5th data-containing circulating memory.

At this point in the operation of the circuit (count 91 in FIG. 7), a complete character for the #16 teletype has been stored in the assembly address position 31 of the data storing delay lines 211. It is to be understood that characters from the other 511 teletype machines could have been stored in other address positions of the circulating memories during the same time that the character from the #16 teletype was stored therein. Sampling of the other teletypewriters, of course, would be interleaved and would occur at intervals spaced two microseconds apart, as discussed hereinbefore.

Figure 8:
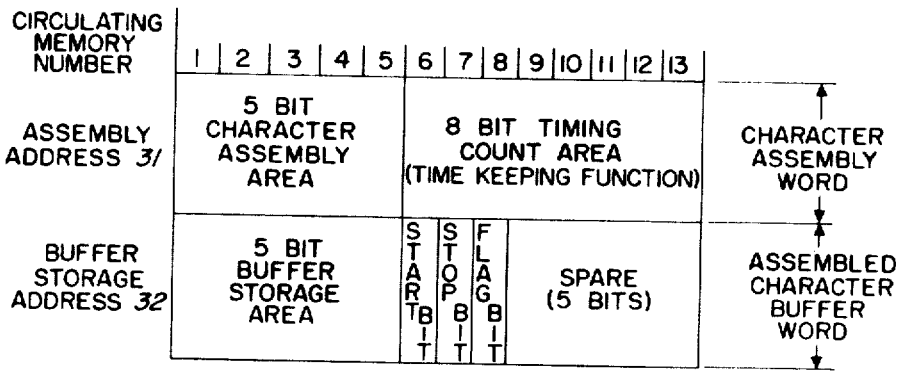
FIG. 8 is a block representation of the bits of a character and its corresponding time-keeping counter in an assembly position and in the associated buffer storage position.

Referring now to FIG. 8, there is shown a graphic representative of the assembly address position 31 of the 13 circulating memories and the immediately following buffer storage address position 32 of said 13 circulating memories. As discussed above, the character is first assembled in an assembly address position, such as address 31, with the five bauds stored in the five data storing circulating memories and the time-keeping function count stored in the eight time-keeping circulating memories. After the word is entirely assembled at count 91 of the time-keeping function (for a 100 millisecond long TTY character), the shifting of the five-bit character to the buffer storage is done. It will be noted that the five-bit character in position 31 is shifted in its entirety to the five data storing circulating memories of the buffer storage address 32. However, the count contained in the time-keeping section of address 31 is not shifted. Rather, such count is set back to zero in preparation for the reception of the next character from the teletypewriter #16.

At the same time the five bits are shifted, the start bit is stored in the sixth circulating memory, which is the first circulating memory of the 8-bit time-keeping system. Also, the stop bit, which was sampled just before the shifting of the character into the buffer stage occurred, is entered into the seventh circulating memory, as shown in FIG. 8.

As only seven bits are used in the buffer storage position for the assembled character storage, the remaining six bits are available for supervisory function. One of such remaining bits is used as a "flag" bit to mark the starting address position when the accumulated stored data is transferred to the processor. More specifically, when such a data transfer is initiated, the "flag" bit is entered in the first word which is transferred out. The assembler then monitors this bit position of the memory output. When the "flag" bit is detected by the monitoring circuit after a complete scanning of the circulating memories, the transmission sequence is terminated by sending an EOT (end of transmission) signal to the processor.

III.—CIRCUIT FOR VERIFYING START OF TTY WORD

Referring now to FIG. 3, there is shown a logic diagram for determining the validity of a start pulse of a teletype character by requiring that the first three counts, i.e., the first three samplings, of the start pulse all indicate the presence of a space. If a mark is present during any of the first three samplings of a start pulse, the count contained in the time-keeping function will be cleared back to zero. It is to be noted that the diagram of FIG. 3 is represented by block 250 in FIG. 2.

In FIG. 3 there are shown three AND gates 300, 301, and 302, which respectively respond to the counts of one, two, and three contained in the time-keeping delay lines. For example, the AND gate 300 contains eight input leads 309 corresponding to the eight outputs for receiving the eight outputs of the eight time-keeping delay lines. However, there are wo additional inputs to AND gate 300; a clock pulse CL on the input so marked, and a teletype sampling input on the lead marked "TTY." Now, if at the count 1 contained in the time-keeping delay lines a space is sampled from the TTY output line, the AND gate 300 will not be conductive; that is, no output will appear therefrom. However, if the sampling of the TTY output line is a mark, then an output pulse will appear at the output of the AND gate 300. Such output pulse will pass through OR gate 303, set the flip-flop 304 which, in turn, will energize adder 214' of FIG. 2 to clear the eight delay lines of the time-keeping circuit. Flip-flop 304 is reset on the following "0" to "1" transition of the clock pulse (see FIG. 5a for such transition times).

In a similar manner, gates 301 and 302 will function to clear the eight delay lines of the time-keeping circuit in the event that the sampling of the TTY is a mark, either on the second or third counts stored in the time-keeping function.

If the sampling of the TTY output should be a space for the first three counts, then all subsequent samplings of the TTY, whether space or mark, cannot operate to clear the count in the time-keeping circuit. An exception is that the count of 91, when the character has been completely assembled in the delay lines, will clear the time-keeping circuits. More specifically, at the count of 91, a pulse will be supplied from count decoder 213 of FIG. 2 through lead 315 to OR gate 303 of FIG. 3, and thence to adder 214' to clear the time-keeping circuit.

Returning again to the initiating of the count in the time-keeping circuit, the first three TTY start pulse samplings are supplied to the time-keeping delay lines through lead 235' of FIG. 3, which is connected to an input of AND gate 306. AND gate 306 has two other inputs, one of which receives a clock pulse and the other of which is connected to the reset side of control flip-flop 324. A clearing pulse from OR gate 303 functions to reset flip-flop 324 to permit conduction through AND gate 303 upon coincidence of the clock pulse and a sampling of a space from the teletype machine. Thus, when the count in the time-keeping circuit is zero, a sampling from the teletype output will pass through AND gate 306, OR gate 307, and then into adder 214' where it will cause a count of "1" to be registered in the time-keeping circuit. When this count of "1" circulates once in the delay lines, it will set the control flip-flop 324 through lead 313 to inhibit the AND gate 306 so that no further samplings of the teletype output can pass therethrough.

It should be noted that only one sampling of the start pulse of a teletype character is required to initiate counting in the time-keeping circuit. Thus, after the counting has been initiated, the teletype samplings are no longer needed to increment the time-keeping circuit and can be disconnected therefrom, which is done by inhibiting gate 306, as described above.

However, if during the following two counts, that is, the second and third count, a sampling of the TTY output indicates a mark, then one of the gates 300, 301, or 302 will pass a pulse through OR gate 303 and not only clear the adder 214' but will also reset the control flip-flop 324 so as to again enable AND gate 306 when the next sampling of a TTY start pulse occurs.

Assuming that the first three samplings of the #16 teletype output have indicated the presence of a start pulse, the time-keeping function will continue to count and will sample the various bauds of the TTY character at the proper times shown in FIG. 7.

IV.—CIRCULATION AND ADDRESSING OF WORDS (FIGS. 5 AND 1)

Figure 5:
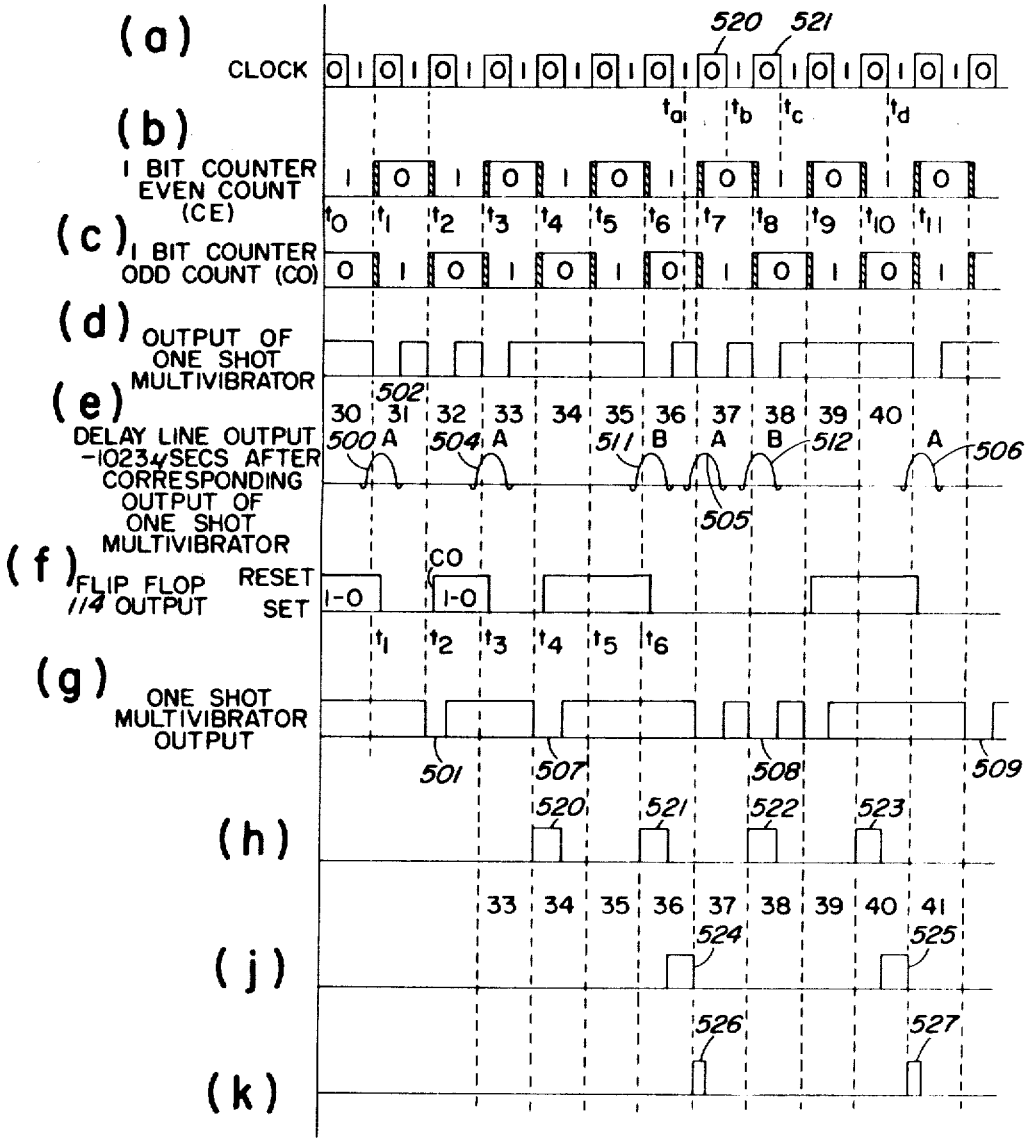
FIG. 5 is a set of waveforms showing the flow of data pulses, both in the assembly positions and in the buffer storage positions, around the circulating memory delay line circuit; and also shows the timing pulses required to synchronize such circulating pulses and to shift said circulating pulses from the assembly positions to the buffer storage positions.

In FIG. 5 there is shown a set of curves illustrating the waveforms involved in circulating a pulse around the delay line. The curves of FIG. 5, while they are also applicable to the time-keeping function, are specifically directed to a single circulating memory in the data storage delay lines.

In FIG. 5e, there is shown a number of pulses, some of which are labeled "A," and some of which are labeled "B." The pulses labeled "A" represent the pulses stored and circulating in the assembly address positions of the delay line. The pulses labeled "B" are those pulses which have been shifted back into the buffer storage address positions of the delay lines. At this time only those pulses marked "A" (which are being assembled) will be discussed. Later herein the circuit means for shifting the assembled characters back into the buffer storage will be discussed and then, subsequently, the curves of FIG. 5 will again be reviewed with emphasis on the pulses shifted into the buffer storage positions.

The numbers 30 through 40 appear in the time intervals of FIG. 5e and represent the address positions of the particular circulating memory being discussed. It is apparent from FIG. 5 that each address position is one microsecond in length and is determined by the clock pulses of FIG. 5a, which clock pulses are generated by the clock pulse generator 223 of FIG. 2. FIGS. 5b and 5c represent the odd and even count output of the one-bit counter 224 of FIG. 2 and are inverse waveforms, as can be seen from FIGS. 5b and 5c. The use of the odd and even outputs of the one-bit counter provides timing for assembly of the characters and also for the transferring of the characters to the buffer storage positions. Such timing is interleaved and occurs on every other microsecond, as will be discussed later.

As a convenient starting point, assume that the pulse 500 of FIG. 5e has just appeared at the output of delay line 111 of FIG. 1. Such output pulse will be amplified by linear amplifier 112 and then supplied to difference amplifier 113. The difference amplifier 113 is driven by clock driver 118 and responds to a "1" to "0" transition of the clock pulse to produce an output on either the lead 120 or 121 of difference amplifier 113, depending on whether the pulse 500, which represents a space, is present, or whether no pulse at all, representing a mark, is present at that time. Since the pulse 500 is present and does represent a space, the output flip-flop 114 of FIG. 1 is responsive to the output of difference amplifier 113 to assume its set condition. Through AND gate 131, OR gate 101, and NAND gate 102, the pedestal gate 105 is responsive to the output of flip-flop 114 and the "1" to "0" transition of the clock pulse at time $t_2$ to trigger one-shot multivibrator 106. The output of one-shot multivibrator 106 is represented by pulse 501 of FIG. 5g. Such output pulse 501 is supplied to the delay line driver 110 of FIG. 1 and thence to the delay line 111.

It should be noted that FIG. 5d also shows output pulses of the one-shot multivibrator. However, the waveform of FIG. 5d represents the signals that exist in a circulating memory 1024 microseconds before the waveform of FIG. 5g. In other words, the output pulse 502 of FIG. 5d represents a particular output pulse of the one-shot multivibrator 106. 1023 microseconds later this particular pulse will have traveled through the delay line 111 of FIG. 1 and is represented by pulse 500 of FIG. 5e. One microsecond later the pulse 500 causes a second triggering of the one-shot multivibrator 106 which is represented by the pulse 501 of FIG. 5g. Thus, the two pulses 502 and 501 of FIGS. 5d and 5g, respectively, present the same bit of data in the circulating memory, but at points in time 1024 microseconds apart.

It is to be noted that it is possible to have 1023 other bits of data interleaved between the pulses 502 and 501 of FIGS. 5d and 5g.

The function of the inhibit AND gate 131 and the AND gate 130 is to prevent the false firing of the pedestal gate 105 when the flip-flop 114 is first set. Referring to FIG. 5, it can be seen that the flip-flop 114 is first set at time $t_1$ by the "1" to "0" transition of the clock pulse through clock driver 118. Since the pedestal gate 105 is also triggered by the "1" to "0" transition of the clock pulse and the set condition of flip-flop 114, it can be seen that false firing of the pedestal gate might occur.

To prevent such false firing, the output of the linear amplifier 112 and the logic "0" level of the clock driver functions to produce an output signal from AND gate 130 which inhibits the gate 131 until the clock pulse assumes its "1" logic condition midway between time $t_1$ and $t_2$.

When the odd count output (CO) of the one-bit counter 224 (FIG. 2) changes to its zero logic level shortly after time $t_2$ it will cause the output flip-flop 114 of FIG. 1 to re-assume its reset state, in preparation for the appearance of the next pulse output from the delay line.

In a similar manner, the pulses 504, 505, and 506 from delay line 111 of FIG. 1 will produce output pulses 507, 508, and 509 from the multivibrator 106 one microsecond later.

The "B" pulses 511 and 512 of FIG. 5e are, as indicated before, stored in the buffer storage positions of the circulating memories. Thus, the pulse 512 in address position 38 originally was entered into address position 37 which, as shown in FIG. 5e, also contains a pulse. It is possible for both positions to contain pulses, even though the assembly position is cleared at the time a word is transferred into the buffer storage position. The aforementioned situation is possible since before information is read from the buffer storage position 36 and before the buffer storage position is cleared, another pulse can be sampled from a new TTY character and be entered into assembly address position 37. Once information is shifted back into a buffer storage position, it is circulated in much the same manner as the information in the assembly address position. However, when a pulse in a buffer storage position causes setting of flip-flop 114, resetting of flip-flop 114 is accomplished by the "1" to "0" transition of the CE output of the one-bit counter 224 (FIG. 2). The outputs of the one-bit counter 224 are used rather than the clock pulse to reset the flip-flop 114 since a slight delay is necessary in order for the detector to provide an output indicating the presence or absence of a pulse from delay line 111. In the presence of a pulse, resetting of flip-flop 114 will not occur. In the absence of a pulse from the delay line the resetting of the output flip-flop 114 will occur, as shown in the curves of FIG. 5.

V.—CIRCUIT FOR SHIFTING INTO BUFFER STORAGE (FIGS. 4 AND 6)

Figure 4:
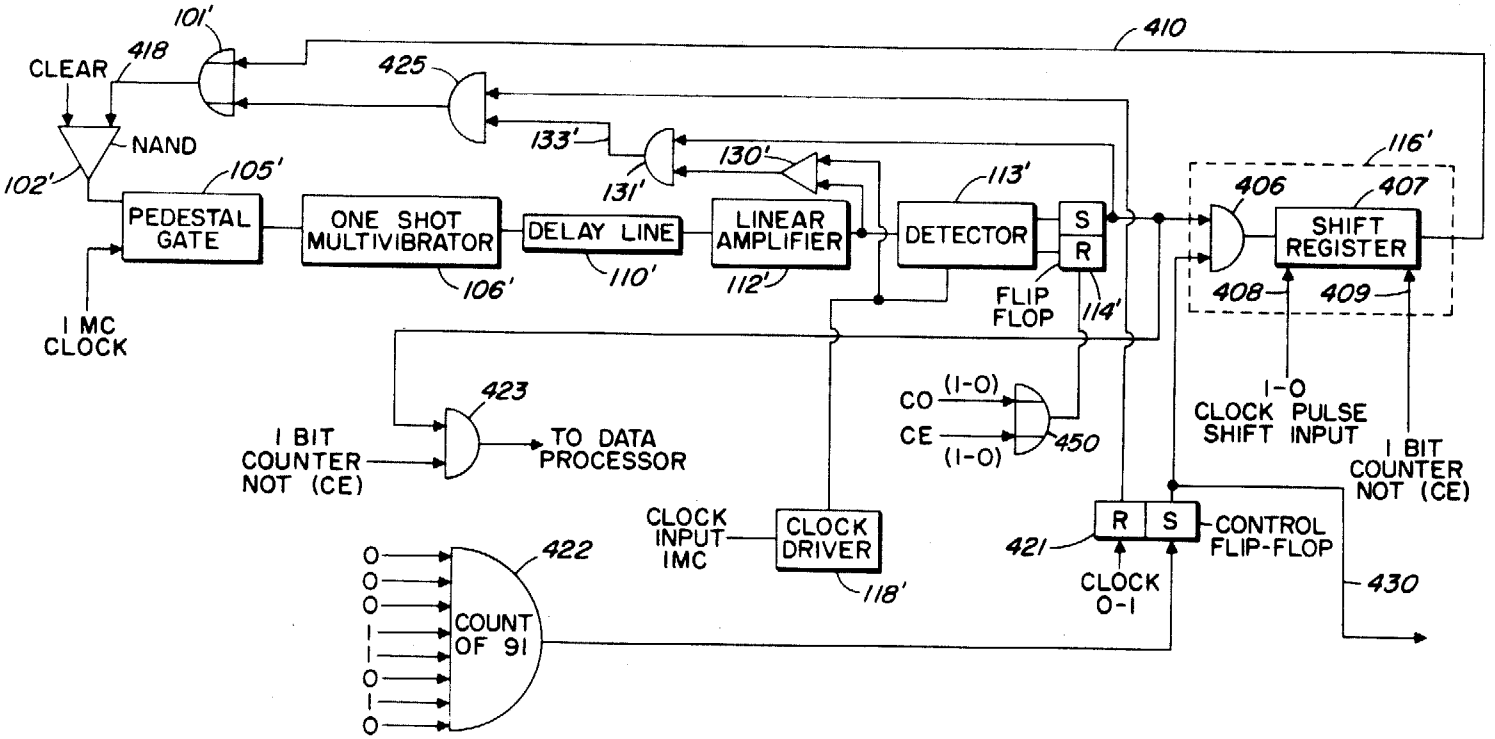
FIG. 4 is a logic diagram illustrating how a word assembled in an assembly position of the circulating memories is shifted back one microsecond to a buffer storage position in the circulating memory delay lines.

Referring now to FIG. 4, there is shown structure for shifting the teletype characters from the assembly address position back to the buffer storage address position. Generally, the operation of the structure of FIG. 4 is as follows. The output of output flip-flop 114' is supplied through normally conductive AND gate 425 to the input of OR gate 101'. When a count of 91 in the time-keeping circuit of any given address occurs, the AND gate 422 will respond thereto to set the control flip-flop 421. The setting of control flip-flop 421 functions to close (become nonconductive) AND gate 425 and to open AND gate 406 so that the output of the flip-flop [404] *114'* will be supplied to the shift register 407 rather than through AND gate 425. Generally speaking, the shift register 407 functions to delay the pulse signal one microsecond and then to supply said pulse to the input of OR gate 101'. The one microsecond delay introduced by the shift register 407 will move the pulse back from the assembly address position to the buffer storage position. Once the pulse has been moved into the buffer storage position, it will circulate in the normal circulating path extending from the output flip-flop 114' directly through AND gate 131', AND gate 425, and thence to the input of OR gate 101'.

Figure 6:
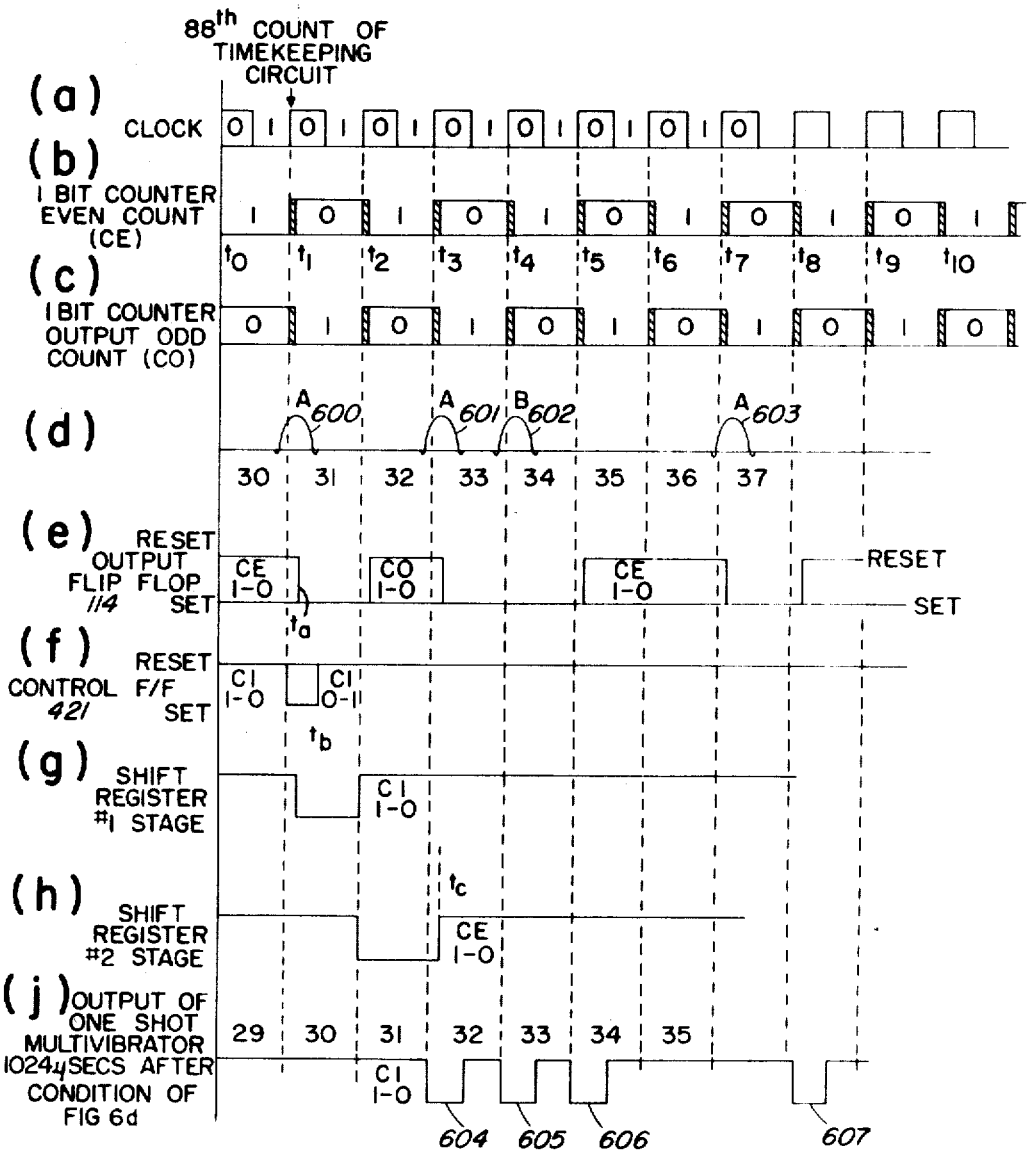
FIG. 6 is a set of waveforms employed in the actual shifting of the assembled teletype characters from the assembly position to the immediately following buffer storage position, which position is one microsecond behind the assembly position.

Referring to the curves of FIG. 6, the actual waveforms and timing necessary to effect the shifting of the data from the assembly addresses to the buffer storage positions are shown. Assume that in a particular circulating memory, the "A" pulses 600, 601, and 603 are circulating and that the "B" pulse 602 is also circulating. Assume, further, that the "A" pulse 600 is in address position 31 and that the TTY character in this assembly address position has been completed and is to be shifted back to the proper storage position.

The count 91 in the time-keeping circuit 422 will trigger the control flip-flop 421 of FIG. 4, whose wave form is shown in FIG. 6f. Specifically, the control flip-flop 421 is set at time $t_1$ in FIG. 6f. The setting of flip-flop 421 [closes (makes conductive) AND gate 425] *opens* and [opens] *closes* AND gate 406 to prevent the circulation of the pulse 600 (FIG. 6d) through the normal circuit path, e.g. Inhibit AND gate 131' ['], OR gate 101', etc. A short interval of time later, at time $t_a$, the output flip-flop 114' is set by the pulse 600 of FIG. 6d, as shown in FIG. 6e. However, at this time $t_a$, the output of flip-flop 114' is supplied through the then [open] *closed* AND gate 406 and to the first stage of the shift register 407, as indicated in FIG. 6g. At the next "0" to "1" transition of the clock pulse occurring at time $t_b$, the control flip-flop 421 is reset so that following pulses, such as "A" pulse 601, will circulate through the normal path.

The "A" pulse 600 has now been completely diverted from the normal circulating path and is stored in stage one of shift register 407. At time $t_2$ the "1" to "0" transition of the clock pulse transfers the information from the first to the second stage of shift register 407; the waveform of said second stage being shown in FIG. 6h. The one level logic of the second stage of the shift register is then supplied through the input of OR gate 101' to pedestal gate 105' so that the next "1" to "0" transition of the clock pulse at time $t_3$ will trigger the one-shot multivibrator 106' to produce the pulse 604 of FIG. 6j.

The pulse 600 has now been transferred from the assembly address 31 to the following buffer storage address 32, as represented by the pulse 604 of FIG. 6j.

The remaining pulses 601, 602, and 603 shown in FIG. 6d were not transferred from their positions and function to trigger the one-shot multivibrator 106' of FIG. 4 in the usual manner described hereinbefore. The pulses 605, 606, and 607 of FIG. 6 were triggered, respectively, by the pulses 601, 602, and 603 of FIG. 6d.

It is to be noted that the shift register 407 is cleared shortly after time $t_3$ at time $t_c$ by a "1" to "0" transition of a CE pulse so that said shift register will have no effect on one-shot multivibrator 106' until another pulse is to be shifted from the address position to the buffer storage position.

At the same time the assembled 5-bit word is transferred back into the buffer storage, transfers of the start and stop pulses are also made into the first two stages of the time-keeping function of circulating memories in the buffer address position. This is shown in FIG. 8. More specifically, the start pulse and the stop pulse are placed in circulating memories #6 and #7. The presence of the start bit indicates to the data processor that an assembled character is contained in the five information bits of the buffer storage word, whereas the presence of the stop bit sample is required to inform the processor as to whether a TTY blank character or an open line condition exists.

The means by which the start and the stop pulse indications are loaded into the buffer storage position is as follows. Referring again to FIG. 4, it will be noted that the output of shift register 407, for data positions, is connected back to the input of the delay line associated with such shift register 407. However, for the start and the stop pulses there is no delay line present in the assembly circulating memories for that purpose. Consequently, such pulses are generated at the time the buffer storage transfer is effected. This can be accomplished as shown in FIG. 4, by supplying the set output of control flip-flop 421 to the shift register circuits of the #6 and #7 delay lines of the time-keeping circulating memories via lead 430; thus introducing the pulse into such delay lines, as shown in FIG. 8, and labeled as start and stop bits.

VI.—READING WORDS INTO DATA PROCESSOR (FIGS. 9 AND 5)

Referring now to FIG. 9, there is shown a means for reading the characters stored in the buffer storage stages into the data processor. More specifically, at certain times the data processor sends a read command signal to the TTY character assembler commanding that the characters stored in the buffer stages be read out to the data processor.

The read command is supplied via lead 913 to the set side of flip-flop 912, and may occur at any time. The set output of the flip-flop 912 is connected to one of the four inputs of AND gate 910. A second input to AND gate 910 is from the set output of flip-flop 904, which flip-flop is set by the "0" to "1" transition of the odd count (CO pulse of the one-bit counter 221 (FIG. 2) and then is subsequently reset at the "0" to "1" transition of the clock pulse supplied via lead 905.

In general, the address corresponding to the assembly position will first be sent to the data processor, followed by the data stored in the buffer storage one microsecond later. Assume, for purposes of discussion, that the read command from the data processor occurs at time $t_a$, as indicated in FIG. 5a. A short interval of time later at time $t_7$, the "0" to "1" transition of pulse CO will occur, setting flip-flop 904 of FIG. 9. Also, at time $t_7$ a clock pulse zero logic (CLO) will occur. Such a check pulse is identified by reference character 520 of FIG. 5a, and is supplied to the input lead 911 of gate 910 of FIG. 9. The fourth input lead of gate 910 is connected to the set side of a flip-flop (such as flip-flop 902 in FIG. 9) of one of the time-keeping circulating memories.

It is to be understood at this point that there is an AND gate 910 for each of the eight time-keeping circulating memories. Similarly, there is a flip-flop 904 for each of the eight time-keeping circulating memories (TKCM). Thus, the gates, such as gates 910, will function to supply to the data processor via lead 928, the addresses of the assembly address position 37, beginning at time $t_7$.

The outputs of all the AND gates 910 are ORRED to a common buffer control flip-flop 907 through common OR gate 930. Thus, when an output from AND gate 910 occurs, the flip-flop 907 will be set. The set output of flip-flop 907 is connected to one of the inputs of AND gate 914. Another input 915 of AND gate 914 is energized at a time $t_8$ when a "0" logic level of the CE pulse of the one-bit counter 224 of FIG. 2 occurs. Also, at time $t_8$, the zero logic level (CLO) of pulse 521 (FIG. 5a) of the clock pulse occurs. During this period of time the AND gate 914 will pass a pulse appearing on the set side of flip-flop 903 in the data storing portion of the buffer storage positions. Such data will pass through AND gate 914 to the data processor via lead 917. It is to be understood that there are five gates such as gate 914; one for each of the five data storing circulating memories in the buffer storage positions. Thus, from the waveforms of FIG. 5, it can be seen that the data from a five data storing positions of the buffer storage positions are supplied to the data processor.

In preparation for the transmission of the information in the next buffer storage position, the flip-flop 904 has been reset by the "0" to "1" transition of the clock pulse at time $t_b$. Such resetting of flip-flop 904 will not affect flip-flop 907 and so will not interfere with the transfer of data from the buffer storage addresses through AND gate 914.

The flip-flop 907 is reset by the coincidence "0" logic of the CE pulse and the "0" to "1" transition of a clock pulse through AND gate 931, which occurs at time $t_e$ as shown in FIG. 5a. Thus, during the time interval $t_8$–$t_e$ the data stored in the data storing circulating memories, such as delay line 901, is supplied from the control flip-flop 903 through AND gate 914 to the data processor.

As discussed hereinbefore, it is necessary to mark the time that the read command is received and the first buffer storage position *is* read from the character assembler. Such marking is done by a flag bit which can be inserted in one of the spare five bits of the assembled buffer word, as shown in FIG. 8. The flag bit is permitted to circulate once during which time all of the words stored in the buffer storage positions can be read out to the processor.

The means for inserting the flag bit in the circulating memory is also shown in FIG. 9. More specifically, the output of AND gate 910 functions to set flip-flop 918 at time $t_7$. The setting of flip-flop 918 results in the setting of flip-flop 920.

Subsequently, at time $t_8$ when a CE pulse occurs on lead 923, AND gate 921 supplies a pulse to the pedestal gate of the [flat] *flag* bit circulating memory to initiate a flag bit pulse in the memory. More specifically, the flag bit pulse is generated in the pedestal gate at time $t_9$ during the occurrence of a "1" to "0" transition of the clock pulse of FIG. 5a.

Flip-flop 920 is reset by the "0" to "1" transition of a CO pulse shortly after time $t_9$ to prevent any further pulses from being generated in the flag bit circulating memory.

After the flag bit pulse is circulated once it appears at the set side of the output flip-flop of the circulating memory containing such flag bit. The lead 925 of FIG. 9 is connected to such set output and functions to reset the flip-flop 912, thus preparing the flip-flop 912 for another read command from the data processor. The flag bit also resets the flip-flop 918 to prepare the circuit for the entering of another flag bit pulse into the flag bit circulating memory.

VII.—COMBINING TWO TTY WORDS BEFORE TRANSMISSION TO DATA PROCESSOR (FIG. 10)

With certain data processors it is possible to transmit more than one TTY character in parallel form at a given time to the processor. For example, in a processor employing sixteen bit words, it is possible to send at least two teletypewriter characters simultaneously, and in parallel, to the processor. Such a procedure requires an additional storage means which will assemble two teletypewriter characters in parallel before transmission to the computer. Such a buffer storage arrangement is shown in FIG. 10.

Generally speaking, the operation of FIG. 10 is as follows. A first teletype character is supplied via five of the leads 1016 to AND gates 1000–1007 from the outputs of AND gates, such as AND gate 914 of FIG. 9. This character is stored in five (1020–1024) of the eight flip-flop means 1020 through 1027. The next character, stored in the adjacent buffer storage positions of the circulating memories, is supplied via five of the leads 1017 to AND gates 1008–1015, and stored in five (1028–1032) of the flip-flop circuits 1028 through 1035. Subsequently the two characters stored in the aforementioned 10 of the 16 flip-flops 1020 to 1035 are ANDED out to the data processor via 10 of the AND gates 1040 to 1055.

More specifically, the operation of the circuit of FIG. 10 is as follows. When the read command from the data processor is supplied to flip-flop 912 of FIG. 9, the AND gate 1036 (FIG. 10) is prepared to become conductive by the logic level supplied to its input lead 1019 from the reset side of flip-flop 912.

At the next "1" to "0" transition of the CE pulse which will be assumed to occur at time $t_7$ in FIG. 5, the flip-flop 1059 will assume its reset condition. Then, at time $t_8$ the TTY character stored in address 38 (FIG. 5) will be supplied to the input leads 1016 from AND gates, such as AND gate 914 of FIG. 9. This data will be stored in five of the flip-flops 1020 through 1027.

At time $t_9$ the next "1" to "0" transition of the CE pulse occurs and the flip-flop 1059 assumes its reset condition. The characters stored in the next buffer storage position 40 of FIG. 5 will then be supplied at time $t_{10}$ via leads 1017 from AND gate, such as AND gate 914 of FIG. 9, through AND gates 1008 through 1015 of FIG. 10, to flip-flops 1028 to 1035. It is to be noted that the single input control flip-flop circuit 1059 switches between the upper and lower groups of buffer storage flip-flops in FIG. 10. Initially, flip-flop 1059 is in a set condition by reason of the read command from the data processor so that the first "1" to "0" transition of the CE pulse will cause it to assume a reset condition, thus assuring that the first character will always be stored in five of the upper eight flip-flops 1020 through 1027 of FIG. 10.

After the two TTY characters are stored in the flip-flops 1020 through 1035 of FIG. 10, read-out occurs by energizing AND gates 1040 through 1055. Such read-out occurs by the coincidence of four different signals supplied to the four different input leads of AND gate 1061. Such four signals include the "1" logic of the clock pulse, the "0" logic of the CE pulse, the set output from flip-flop 1059, and the set output from flip-flop 918 of FIG. 9. The read-out of the flip-flops 1020 through 1035 thus will occur at time intervals $t_d$–$t_{11}$ of FIG. 5. All the flip-flops 1020 through 1035 are then cleared by a "1" to "0" transition of the clock pulse at time $t_{11}$ through the AND gate 1039. Such clearance can only occur during the coincidence of the set condition of flip-flop 1059, the "0" logic of the CE pulse, and the "1" to "0" transition of the clock pulse The curve of FIG. 5h shows the signals read into the buffer flip-flop storages 1020 through 1035. More specifically, the pulses 520 through 523 represent (one bit of each) the TTY characters read into the flip-flops 1020 through 1035 of FIG. 10 at buffer postions 34, 36, 38, and 40, respectively (assuming that bauds were actually stored in such buffer storage positions). In FIG. 5j the pulses 524 and 525 represent the read-out of the information contained in flip-flops 1020 to 1035 of FIG. 10. In FIG. 5k the pulses 526 and 527 represent the clearing of flip-flops 1020 through 1035 by "1" to "0" transition of the clock pulse supplied to input lead 1038 of AND gate 1039.

It is to be understood that the form of the invention shown and described herein is but a preferred embodiment thereof and that many variations in detailed logic and in timing may be made without departing from the spirit or the scope of the invention.

I claim:

1. Character assembling means for assembling in parallel [from] *form* encoded signals received in serial form from a plurality of character sources and comprising:

a first plurality of N circulating memories each having input means, output means, and in each circulating cycle a plurality of time positions with respect to an arbitrary time reference;

selecting means [for connecting] the output of any given character source to the inputs of successive ones of said N circulating memories at integral multiples of the circulating time of said N circulating memories to store a single bit in each individual one of said N circulating memories at *different* ones of said time positions;

[said selecting means further constructed to connect the outputs of said character sources other than said given character sources to said N circulating memories at different and predetermined ones of said time positions;]

*said* time-keeping means comprising a second plurality of M circulating memories each having a plurality of time positions and constructed to respond to the circulation of data in the time positions of said N circulating memories to record separately the number of circulations of each data-containing time positions of said N circulating memories [;],

[and] transferring means for transferring data from any given time position to said output means [.];

*said time positions of said first and second pluralities of circulating memories comprising:*

*(a) a first group of time positions which are even numbered,*

*(b) and a second group of time positions which are odd numbered and which are individually positioned alternately with individual time positions of said first group;*

*said selecting means are constructed to connect the outputs of said character sources to the said first plurality of circulating memories at points in time to enter data into the said odd time Positions of said circulating memories;*

*and said transferring means comprises shifting means for shifting a complete assembled character from said odd time position to the next adjacent even numbered time position.*

[2. Character assembling means in accordance with claim 1 in which:

said time positions of said first and second pluralities of circulating memories comprise:

(a) a first group of time positions which are even numbered;

(b) and a second group of time positions which are odd numbered and which are individually positioned alternately with individual time positions of said first group;

and in which said selecting means is constructed to connect the outputs of said character sources to the said first plurality of circulating memories at points in time to enter data into the said odd time positions of said circulating memories;

and in which said transferring means comprises shifting means for shifting a complete assembled word from said odd time position to the next adjacent even numbered time position.]

3. Character assembling means in accordance with claim [2] *1* in which said shifting means comprises:

pulse delaying means;

diverting means for diverting selected data bits from the said first plurality of circulating memories and into said pulse delaying means;

reinsertion means for reinserting the data bit pulses passing through said pulse delaying means back into said first plurality of circulating memories and into the even time positions thereof following the odd time positions from which said data bits were diverted.

4. Character assembling means in accordance with claim 3 in which:

said transferring means further comprises:

gating means responsive to a command signal for gating the data contained in the even numbered time positions from the outputs of said first plurality of circulating memories to said output means;

and means for supplying said command signal to said gating means.

5. Character assembling means in accordance with claim 4 comprising:

start pulse verifying means for verifying the existence of an initial bit in a [word] *character* being supplied to said character assembler means from one of said character sources;

said start pulse verifying means comprising gating means responsive to a no-bit sampling over a preselected number of samplings of said initial bit to produce an output signal indicating the absence of an initial bit.

[6. Character assembling means in accordance with claim 5 in which:

said time-keeping means is responsive to said output signal from said verifying means to clear to zero.]

[7. Character assembling means in accordance with claim 1 in which:

said time-keeping means is responsive to the initial bit of a word from any of said character sources to initiate the circulation of a pulse in the corresponding time position of said second plurality of circulating memories;

adder means responsive to each circulation of a pulse in the said corresponding time position of one of said second plurality of circulating memories to add a count of "1" to the total count contained in said corresponding time positions of said second plurality of time positions, thereby keeping a record of the total number of circulations of a pulse in said corresponding time position measured from the initial bit of the word being transmitted to said character assembler.]

[8. Character assembling means in accordance with claim 7 comprising:

time-keeping count decoder means responsive to the count contained in each time position of said second plurality of circulating memories to sample at preselected times successive bits of words being transmitted to said character assembler, and injecting means for injecting said samplings into preselected ones of said first plurality of circulating memories at time positions each of which bears a constant cyclical relation with the sampling time of a given character source.]

9. Character assembling means in accordance with claim [8]*31* in which:

said time positions of said first and second pluralities of circulating memories comprise:

(a) a first group of time positions which are even numbered;

(b) and a second group of time positions which are odd numbered and which are individually positioned alternately with individual time positions of said first group;

and in which said selecting means is constructed to connect the outputs of said character sources to the said first plurality of circulating memories at points in time to enter data into the said odd time positions of said circulating memories;

and in which said transferring means comprises shifting means for shifting a complete assembled [word] *character* from said odd time position to the next adjacent even numbered time position.

10. Character assembling means in accordance with claim 9 in which said shifting means comprises:

pulse delaying means;

diverting means for diverting selected data bits from the said first plurality of circulating memories and into said pulse delaying means;

reinsertion means for reinserting the data bit pulses passing through said pulse delaying means back into said first plurality of circulating memories and into the even time positions thereof following the odd time positions from which said data bits were diverted.

11. Character assembling means in accordance with claim 10 in which:

said transferring means further comprises:

gating means responsive to a command signal for gating the data contained in the even numbered time positions from the outputs of said first plurality of circulating memories to said output means;

and means for supplying said command signal to said gating means.

12. Character assembling means in accordance with claim 11 comprising:

start pulse verifying means for verifying the existence of an initial bit in a [word] *character* being supplied to said character assembler from one of said character sources;

said start pulse verifying means comprising gating means responsive to a no-bit sampling over a preselected number of samplings of said initial bit to produce an output signal indicating the absence of an initial bit.

[13. Character assembling means in accordance with claim 12 in which:

said time-keeping means is responsive to said output signal from said verifying means to clear to zero.]

14. Character assembling means for assembling in parallel form encoded signals received in serial form from a plurality of character sources and comprising:

a first plurality of N circulating memories each having input means, output means, and a plurality of odd and even numbered time positions with respect to any arbitrary time reference in the circulating cycle of said circulating memories, and where N is at least equal to the number of bits to be assembled in parallel form;

selecting means [for connecting] *comprising time-keeping means and constructed to connect* the output of any given character source to the inputs of successive ones of said first plurality of circulating memories at integral multiples of the circulating time of said circulating memories to store a single bit in each of individual ones of said N circulating memories at one of said even time positions;

[said selecting means further constructed to connect the outputs of said character sources other than said given character source to said first plurality of circulating memories at different and predetermined ones of said points in time over the circulating time of the circulating memories;]

*said* time-keeping means comprising a second plurality of M circulating memories having a plurality of time positions and constructed to respond to the circulation of data in the time positions of said N circulating memories to record separately the number of circulations of each data-containing time position of said N circulating memories;

shifting means for shifting data stored in any even time position to the odd time position immediately adjacent thereto;

and transferring means for trannsferring data from odd time [position] *positions* to said output means.

15. Character assembling means in accordance with claim 14 in which said shifting means comprises:

pulse delaying means;

diverting means for diverting selected data bits from the said first plurality of circulating memories and into said pulse delaying means;

reinsertion means for reinserting the data bit pulses passing through said pulse delaying means back into said first plurality of circulating memories and into the even time positions thereof following the odd time positions from which said data bits were diverted.

16. Character assembling means in accordance with claim 15 in which:

said transferring means further comprises:

gating means responsive to a command signal for gating the data contained in the even numbered time positions from the outputs of said first plurality of circulating memories to said output means;

and means for supplying said command signal to said gating means.

17. Character assembling means in accordance with claim 16 comprising:

start pulse verifying means for verifying the existence of an initial bit in a [word] *character* being supplied to said character assembler means from one of said character sources;

said start pulse verifying means comprising gating means responsive to a no-bit sampling over a preselected number of samplings of said initial bit to produce an output signal indicating the absence of an initial bit.

18. Character assembling means in accordance with claim 17 in which:

said time-keeping means is responsive to said output signal from said verifying means to clear to zero.

19. Character assembling means in accordance with claim 14 in which:

said time-keeping means is responsive to the initial bit of a [word] *character* from any of said character sources to initiate the circulation of a pulse in the corresponding time position of said second plurality of circulating memories;

adder means responsive to each circulation of a pulse in the said corresponding time position of one of said second plurality of circulating memories to add a count of "1" to the total count contained in said corresponding time positions of said second plurality of time positions, thereby keeping a record of the total number of circulations of a pulse in said corresponding time position measured from the initial bit of the [word] *character* being transmitted to said character assembler.

20. Character assembling means in accordance with claim 19 comprising:

time-keeping count decoder means responsive to the count contained in each time position of said second plurality of circulating memories to sample at preselected times successive bits of [words] *characters* being transmitted to said character assembler, an injecting means for injecting said samplings into preselected ones of said first plurality of circulating memories at time position each of which bears a constant cyclical relation with the sampling time of of a given character source.

21. Character assembling means in accordance with claim 20 in which said shifting means comprises:

pulse delaying means;

diverting means for diverting selected data bits from the said first plurality of circulating memories and into said pulse delaying means;

reinsertion means for reinserting the data bit pulses passing through said pulse delaying means back into said first plurality of circulating memories and into the even time positions thereof following the odd time positions from which said data bits were diverted.

22. Character assembling means in accordance with claim 21 in which:

said transferring means further comprises:

gating means responsive to a command signal for gating the data contained in the even numbered time positions from the outputs of said first plurality of circulating memories to said output means;

and means for supplying said command signal to said gating means.

23. Character assembling means in accordance with claim 22 comprising:

start pulse verifying means for verifying the existence of an initial bit in a [word] *character* being supplied to said character assembler from one of said character sources;

said start pulse verifying means comprising gating means responsive to a no-bit sampling over a preselected number of samplings of said initial bit to produce an output signal indicating the absence of an initial bit.

[24. Character assembling means in accordance with claim 23 in which:

said time-keeping means is responsive to said output signal from said verifying means to clear to zero.]

25. Character assembling means for assembling in parallel form coded signals received in serial form from a plurality of data sources and comprising:

cyclical [counting] *accessing* means for sequentially [polling] *accessing* said data sources at a rate of P [polls] *accesses* per second;

first and second pluralities of circulating memories each having input means, output means, and a circulating time equal to the cycling time of said cyclical [counting] accessing means;

sampling means [for sampling] *comprising time-keeping means and constructed to sample* the output signals of said data sources at predetermined times coinciding with preselected [polling] *accessing* times and [for supplying] *to supply* said samplings into preselected ones of said first plurality of circulating memories at first time positions spaced 1/P seconds apart, with any given time position being unique to a given data course;

*said* time-keeping means [including] *comprising* said second plurality of circulating memories and accumulating means responsive to the entering of data in each of said first time positions of said first plurality of circulating memories to maintain a count of the number of circulations of data in said [each] first time positions;

the said second plurality of circulating memories having each of the counts contained therein positioned in a time position having a known and fixed relationship with the time position of the first plurality of circulating memories whose circulating count is being recorded;

[and] means for transferring data from said character assembling means to said output means [.];

*said time positions of said first and second pluralities of circulating memories comprising:*

*(a) a first group of time positions which are even numbered,*

*(b) and a second group of time positions which are odd numbered and which are individually positioned alternately with individual time positions of said first group;*

*said sampling means connecting the outputs of said character sources to the said first plurality of circulating memories at points in time to enter data into the said odd time positions of said circulating memories;*

*and said transferring means comprising shifting means for shifting a complete assembled word from said odd time position to the next adjacent even numbered time position.*

[26. Character assembling means in accordance with claim 25 in which:

said time positions of said first and second pluralities of circulating memories comprise:

(a) a first group of time positions which are even numbered;

(b) and a second group of time positions which odd numbered and which are individually positioned alternately with individual time positions of said first group;

and in which said cyclical counting means and said sampling means coact to connect the outputs of said character sources to the said first plurality of circulating memories at points in time to enter data into the said odd time positions of said circulating memories;

and in which said transferring means comprises shifting means for shifting a complete assembled word from said odd time position to the next adjacent even numbered time position.]

27. Character assembling means in accordance with claim [26] *25* in which said shifting means comprises:

pluse delaying means;

diverting means for diverting selected data bits from the said first plurality of circulating memories and into said pulse delaying means;

reinsertion means for reinserting the data bit pulses passing through said pulse delaying means back into said first plurality of circulating memories and into the even time positions thereof following the odd time positions from which said data bits were diverted.

28. Character assembling means in accordance with claim 27 in which:

said transferring means further comprises:

gating means responsive to a command signal for gating the data contained in the even numbered time positions from the outputs of said first plurality of circulating memories to said output means;

and means for supplying said command signal to said gating means.

29. Character assembling means in accordance with claim 28 comprising:

start pulse verifying means for verifying the existence of an initial bit in a [word] *character* being supplied to said character assembler means from one of said character sources;

said start pulse verifying means comprising gating means responsive to a no-bit sampling over a preselected number of samplings of said initial bit to produce an output signal indicating the absence of an initial bit.

[30. Character assembling means in accordance with claim 29 in which:

said time-keeping means is responsive to said output signal from said verifying means to clear to zero.]

*31. Character assembling means for assembling in parallel form encoded signals received in serial form from a plurality of character sources and comprising:*

*a first plurality of N circulating memories each having input means, output means, and in each circulating cycle a plurality of time positions with respect to an arbitrary time reference;*

*selecting means comprising time-keeping means and constructed to connect the output of any given character source to the inputs of successive ones of said N circulating memories at integral multiples of the circulating time of said N circulating memories to store a single bit in each individual one of said N circulating memories at different ones of said time positions;*

*said time-keeping means comprising a second plurality of M circulating memories each having a plurality of time positions and constructed to respond to the circulation of data in the time positions of said N circulating memories to record separately the number of circulations of each data-containing time position of said N circulating memories;*

*transferring means for transferring data from any given time position to said output means;*

*said time-keeping means being responsive to the initial bit of a character from any of said character sources to initiate the circulation of a pulse in the corresponding time position of said second plurality of circulating memories;*

*adder means responsive to each circulation of a pulse in the corresponding time position of one of said second plurality of circulating memories to add a count "1" to the total count contained in said corresponding time positions of said second plurality of time positions, thereby keeping a record of the total number of circulations of a pulse in said corresponding time position measured from the initial bit of the character being transmitted to said character assembler;*

*time-keeping count decoder means responsive to the count contained in each time position of said second plurality of circulating memories to sample at preselected times successive bits of characters being transmitted to said character assembler,*

*and injecting means for injecting said samplings into preselected ones of said first plurality of circulating memories at time positions each of which bears a constant cyclical relation with the sampling time of a given character source.*

References Cited

The following references, cited by the Examiner, are of record in the patented file of this patent or the original patent.

UNITED STATES PATENTS

| | | | |
|---|---|---|---|
| 2,905,930 | 9/1959 | Golden | 340—172.5 X |
| 2,919,967 | 1/1960 | Schwartz | 340—172.5 X |
| 3,229,259 | 1/1966 | Barker et al. | 340—172.5 |
| 3,166,734 | 1/1965 | Helfrich | 340—147 |
| 3,310,780 | 3/1967 | Gilley et al. | 340—172.5 |

PAUL J. HENON, Primary Examiner

P. R. WOODS, Assistant Examiner

U.S. Cl. X.R.

178—52